May 23, 1950  H. C. SUNDBY  2,508,975
PROVING RING
Filed April 26, 1946
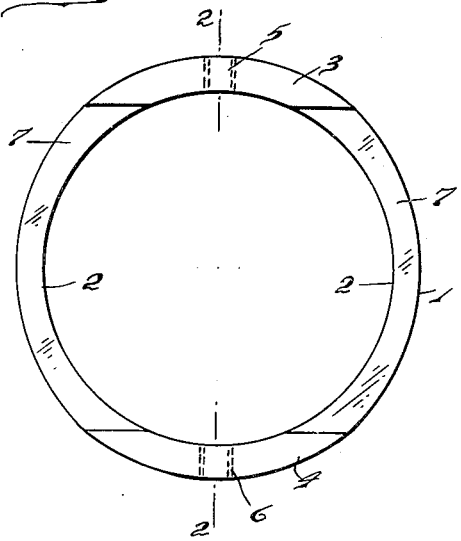
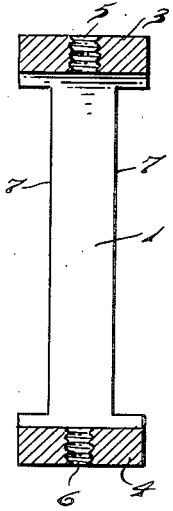
INVENTOR.
Harold C. Sundby
by
Herbert P. Fairbanks
ATTORNEY.

Patented May 23, 1950

2,508,975

UNITED STATES PATENT OFFICE 2,508,975

PROVING RING

Harold C. Sundby, Philadelphia, Pa., assignor to Tinius Olsen Testing Machine Company, Philadelphia, Pa., a corporation of Pennsylvania Application April 26, 1946, Serial No. 665,135

3 Claims. (Cl. 73—141)

The object of this invention is to devise a novel ring in which the deflection is proportional to the applied load, and which is adapted to be used as a weighing system or for calibrating a weighing system.

With the advent of the modern testing machines and the number thereof in use throughout the country, it became impractical to verify their accuracy by utilizing the dead weight, or proving lever and weight principal, since it would necessitate the shipping of such mechanism from place to place for calibration purposes. Proving rings were therefore devised which can be conveniently carried wherever required for calibration work.

A proving ring is an elastic ring suitable for calibrating a testing machine, and the deflection of the ring when loaded along its diameter is measured by means of a micrometer screw and a vibrating reed mounted diametrically in the ring. The ring is heat treated, ground and polished, and the heat treating insures uniform grain structure and elastic properties with low hysteresis characteristics.

A further object of the invention is to devise a novel construction of a ring which can be economically manufactured, and which will be accurate and reliable in use.

A further object is to devise a ring which can be used under tension or compression.

With the foregoing and other objects in view as will hereinafter clearly appear, my invention comprehends a novel ring for use as a weighing system or for calibrating a weighing system.

For the purpose of illustrating the invention, I have shown in the accompanying drawings a preferred embodiment of it which I have found in practice to give satisfactory and reliable results. It is, however, to be understood that the construction illustrated is susceptible of modification within the scope of the appended claims.

Figure 1 is a front elevation of a proving ring, embodying my invention.

Figure 2 is a section on line 2—2 of Figure 1.

Similar numerals of reference indicate corresponding parts.

Referring to the drawings:

The construction, arrangement and operation of the measuring device and the vibrating reed is now well known in this art and is clearly disclosed in Bulletin No. 16, of Tinius Olsen Testing Machine Company, of Philadelphia, Pa., and since this invention relates to the proving ring per se it is deemed that a general description of the measuring device and reed is sufficient for an understanding of such parts and their operation.

The proving ring 1 shown in the drawings has its outer periphery concentric. The inner faces of its side walls as shown at 2 are eccentric so that the side walls progressively increase in thickness from the transverse diameter of the ring to the top 3 and bottom 4 of the ring. The top portion is provided with a threaded aperture 5 and the bottom portion is provided with a threaded aperture 6 adapted to receive the means for securing it in operating position. The side walls at opposite sides are cut away as at 7. It will therefore be clear that the ring has its greatest flexibility at the transverse diameter and progressively decreases in flexibility to the rigid top and bottom portions.

Proving rings can be used with a dial indicator, or with a measuring device and an electrically operated vibrating reed so that load determinations can be duplicated with extreme accuracy due to the uniformity of reed vibrations.

The conventional measuring device consists of a precision machined micrometer screw to which a uniformly graduated dial is attached. The reference index of the dial is graduated for taking vernier readings. The reed is used as a contact between the ring and the micrometer.

Proving rings can be arranged for tension loading as well as for compression loading.

When used for compression loading, the ring is placed in operating position, and, if used with a micrometer screw and reed, the operation is as follows:

The micrometer screw is lowered so that the reed will not be distorted, and the ring is preloaded several times to the maximum load to be used in the calibration in order to place the ring in its cyclic operating condition. The zero is noted before and after each load application and a constant zero reading is obtained. The reed is vibrated by a battery, and, with the reed in motion, the lowest calibration load is applied, and the reading of the ring and load indicated by the testing machine noted. The load is then removed and the zero reading checked. From these two readings the deflection of the ring is computed. To obtain the load indicated by the proving ring, the deflection is multiplied by the corresponding calibration constant for that deflection as determined from a chart furnished with the ring. The procedure is followed for other loads until a full calibration is obtained. The ring is calibrated to measure increasing loads.

When the ring is to be used in a weighing system, it can be used under tension or compression to determine the applied load.

One typical manner of using the ring under compression in a weighing system would be to position the ring between a fixed portion of the frame and one of the grip holders, as will be apparent to those skilled in this art without detailed description and illustration.

Having thus described my invention, what I claim as new and desire to secure by Letters Patent is:

1. A ring for determining deflection, having its outer periphery concentric, and having its side walls of greatest flexibility at the transverse diameter of the ring, and progressively decreasing in flexibility towards the top and bottom of the ring, the top and bottom portions of the ring being of greater width and thickness than the side walls of the ring.

2. A ring for determining deflection, having its outer periphery concentric, and having its side walls progressively increasing in thickness from the transverse diameter of the ring towards the top and bottom of the ring, the top and bottom portions of the ring being of greater width and thickness than the side walls of the ring.

3. A proving ring, comprising a metallic ring having its side walls cut away between its top and bottom portions to reduce the width of the side walls and to contribute to form enlarged heads at the top and bottom of the ring, the outer periphery of the ring being concentric, and the inner periphery of the ring being eccentric and gradually increasing in thickness from the transverse diameter of the ring to said enlarged heads.

HAROLD C. SUNDBY.

REFERENCES CITED

The following references are of record in the file of this patent:

UNITED STATES PATENTS

| Number | Name | Date |
| --- | --- | --- |
| 1,614,354 | Faber | Jan. 11, 1927 |
| 1,623,238 | Frost | Apr. 5, 1927 |
| 1,647,272 | Chatillon | Nov. 1, 1927 |
| 1,648,375 | Whittemore et al. | Nov. 8, 1927 |
| 1,724,993 | Coker | Aug. 20, 1929 |

FOREIGN PATENTS

| Number | Country | Date |
| --- | --- | --- |
| 170,392 | Great Britain | Oct. 19, 1921 |
| 332,165 | Great Britain | July 17, 1930 |